United States Patent
Kaing et al.

(10) Patent No.: US 11,305,508 B2
(45) Date of Patent: Apr. 19, 2022

(54) IMPACT RESISTANT, TUBULAR TEXTILE SLEEVE AND METHOD OF CONSTRUCTION THEREOF

(71) Applicant: FEDERAL-MOGUL POWERTRAIN LLC, Southfield, MI (US)

(72) Inventors: Alice Kaing, Margny-les-Compiegne (FR); Melanie Veronneau, Borest (FR); Patrick Thomas, Crepy-en-Valois (FR); Tianqi Gao, Exton, PA (US); Xiaodan Qiu, Exton, PA (US); Alexa Woodruff, Ardmore, PA (US); Emma Adamski, Pottstown, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 351 days.

(21) Appl. No.: 16/243,677

(22) Filed: Jan. 9, 2019

(65) Prior Publication Data
US 2019/0211482 A1    Jul. 11, 2019

Related U.S. Application Data

(60) Provisional application No. 62/681,006, filed on Jun. 5, 2018, provisional application No. 62/615,842, filed on Jan. 10, 2018.

(51) Int. Cl.
*B32B 1/08*     (2006.01)
*B32B 5/12*     (2006.01)
(Continued)

(52) U.S. Cl.
CPC ............... *B32B 1/08* (2013.01); *B32B 5/02* (2013.01); *B32B 5/024* (2013.01); *B32B 5/04* (2013.01);
(Continued)

(58) Field of Classification Search
CPC .. B32B 1/08; B32B 5/02; B32B 5/024; B32B 5/026; B32B 5/028; B32B 5/04; B32B 5/08; B32B 5/10; B32B 5/12
See application file for complete search history.

(56) References Cited

U.S. PATENT DOCUMENTS

| 3,669,157 A | 6/1972 | Woodall, Jr. et al. |
| 4,754,685 A | 7/1988 | Kite et al. |
| (Continued) | | |

FOREIGN PATENT DOCUMENTS

| CN | 10821539 B | 4/2013 |
| CN | 105247127 A | 1/2016 |
| (Continued) | | |

OTHER PUBLICATIONS

International Search Report, dated May 10, 2019 (PCT/US2019/012954).

*Primary Examiner* — Walter Aughenbaugh
(74) *Attorney, Agent, or Firm* — Robert L. Stearns; Dickinson Wright, PLLC

(57) ABSTRACT

A protective textile sleeve for routing and protecting elongate members against impact and method of constructed thereof are provided. The sleeve includes a plurality of yarns interlaced with one another, with the interlaced yarns forming an elongate, circumferentially continuous, tubular wall extending lengthwise along a longitudinal axis between opposite open ends. At least some of the plurality of yarns include tubular yarn having a central cavity extending along the length of the tubular yarn, thereby providing an impact resistant, dual layered wall to the tubular yarn. The sleeve can be constructed in a weaving, braiding or knitting process, wherein the tubular yarn can be interlaced as a woven yarn, braided yarn, or knit yarn, and further, the tubular yarn can be interlaced as an inserted yarn.

44 Claims, 5 Drawing Sheets

(51) Int. Cl.
*D03D 3/02* (2006.01)
*D04C 1/06* (2006.01)
*D02G 3/36* (2006.01)
*D04B 21/20* (2006.01)
*D04B 1/22* (2006.01)
*D03D 15/44* (2021.01)
*D03D 15/567* (2021.01)
*D03D 1/00* (2006.01)
*B32B 5/02* (2006.01)
*B32B 5/04* (2006.01)

(52) U.S. Cl.
CPC ............. *B32B 5/12* (2013.01); *D02G 3/36* (2013.01); *D03D 1/0043* (2021.05); *D03D 3/02* (2013.01); *D03D 15/44* (2021.01); *D03D 15/567* (2021.01); *D04B 1/225* (2013.01); *D04B 21/205* (2013.01); *D04C 1/06* (2013.01); *D10B 2401/04* (2013.01); *D10B 2403/02* (2013.01); *D10B 2403/0241* (2013.01); *D10B 2505/12* (2013.01)

(56) References Cited

U.S. PATENT DOCUMENTS

| 4,777,859 | A | 10/1988 | Plummer, Jr. |
| 4,952,437 | A * | 8/1990 | Winterhoff ............... B32B 7/02 428/68 |
| 5,744,206 | A | 4/1998 | Russek et al. |
| 7,216,678 | B2 * | 5/2007 | Baer ...................... F16L 59/10 139/384 R |
| 2009/0049868 | A1 | 2/2009 | Malloy |
| 2009/0049869 | A1 | 2/2009 | Malloy et al. |
| 2014/0273699 | A1 | 9/2014 | Zhang et al. |
| 2021/0002799 | A1 | 1/2021 | Okawa et al. |

FOREIGN PATENT DOCUMENTS

| CN | 10884611 | A | 11/2018 |
| EP | 0134864 | A2 | 3/1985 |
| EP | 0249333 | A1 | 12/1987 |
| JP | 2012031527 | A | 2/2012 |
| WO | 2009026578 | A1 | 2/2009 |

* cited by examiner

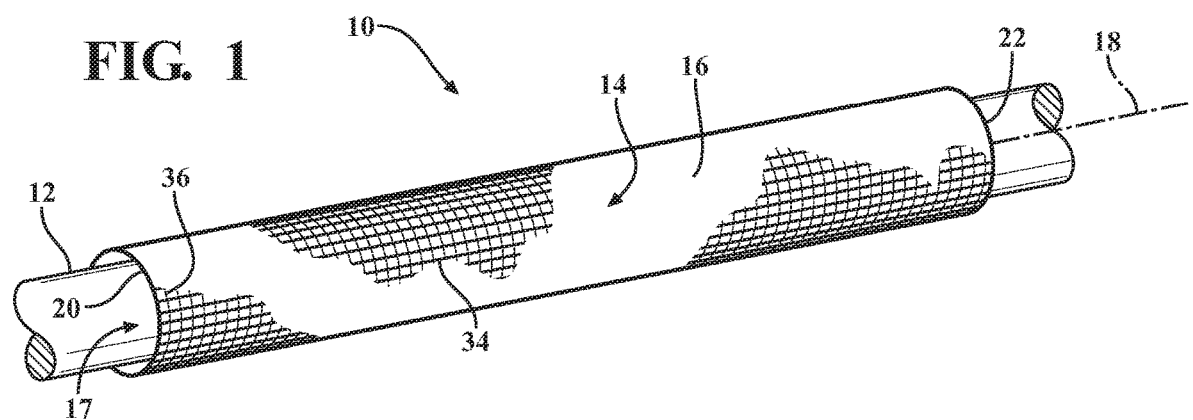
FIG. 1
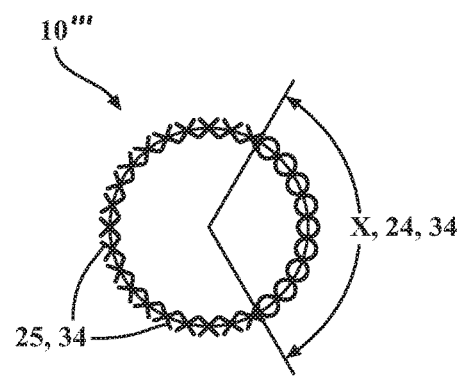
FIG. 1A
FIG. 1C
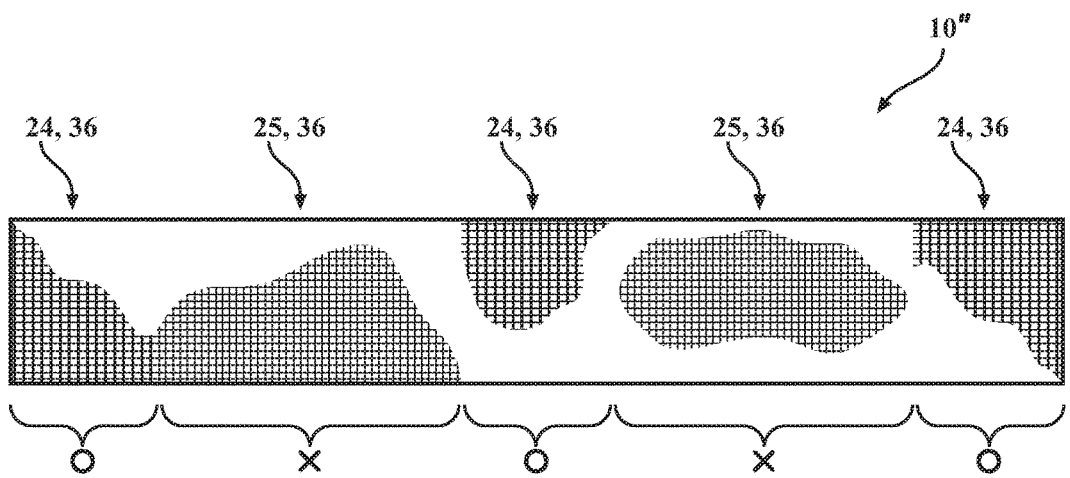
FIG. 1B

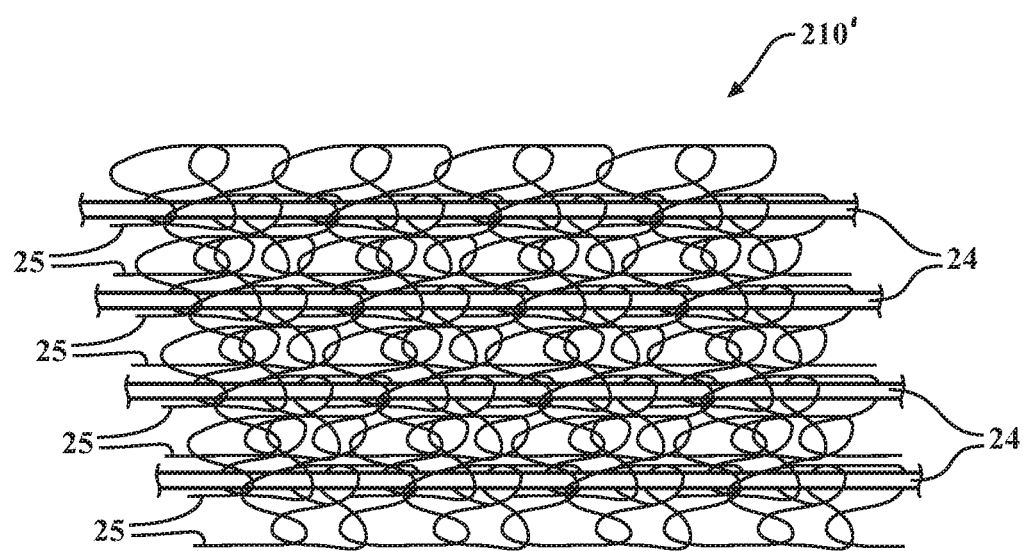
FIG. 6A
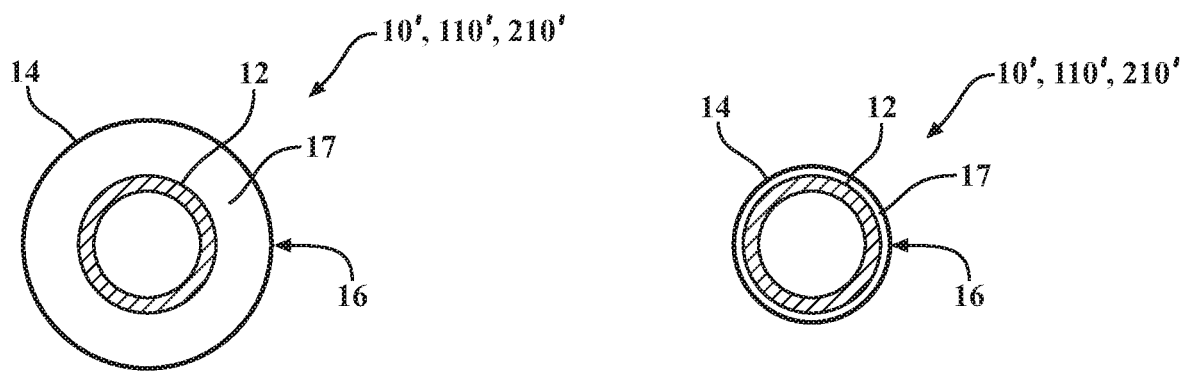
FIG. 7A
FIG. 7B
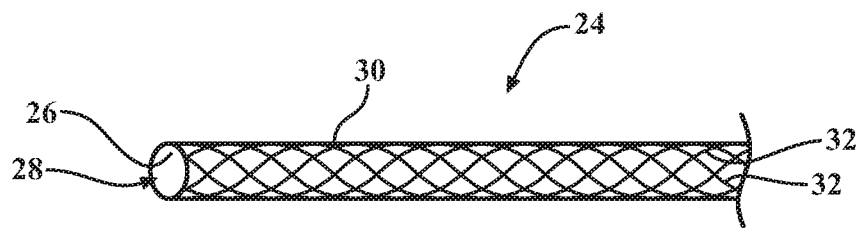
FIG. 8

IMPACT RESISTANT, TUBULAR TEXTILE SLEEVE AND METHOD OF CONSTRUCTION THEREOF

CROSS-REFERENCE TO RELATED APPLICATION

This application claims the benefit of U.S. Provisional Application Ser. No. 62/615,842, filed Jan. 10, 2018 and the benefit of U.S. Provisional Application Ser. No. 62/681,006, filed Jun. 5, 2018, both of which are incorporated herein by reference in their entirety.

BACKGROUND OF THE INVENTION

1. Technical Field

This invention relates generally to sleeves for protecting elongate members contained therein, and more particularly to impact resistant, tubular textile sleeves.

2. Related Art

It is known to contain elongate members, such as wires, wire harnesses, cables and conduits of various types in textile sleeves to provide protection to the elongate members against impact and abrasion, fluid and thermal affects. In applications where high impact resistance is needed to prevent damage to the sleeve and the contents therein, both wrappable and circumferentially continuous, tubular sleeves are known. Though each can be made to provide protection against impact forces and abrasion, each known construction comes with drawbacks.

Wrappable textile sleeves typically require secondary features to secure them about the elongate member being protected, such as clamps, straps, tapes and the like, and thus, additional labor and time is required during assembly, thereby increasing the cost of assembly. Further, having to keep the secondary features in stock is costly. Further yet, the secondary feature presents a possibility of coming undone during use, thereby potentially risking direct exposure of the elongate member to environmental effects. In addition, wrappable sleeves, in order to provide a high impact resistance, typically need to be wrapped to form multiple layers overlying one another, thereby forming a dual walled section, or more, which adds material cost, labor cost, and can result in an overly bulky sleeve not suitable for use in tight spaces. Further yet, wrappable sleeves typically have a non-uniform thickness over an overlap region where lengthwise extending opposite edges of a wall of the sleeve are overlapped on one another, and thus, the outer envelop (occupied space) of the sleeve has a non-uniform, increased thickness, reduced flexibility region that can further prevent it from being used in tight, meandering areas, or otherwise make assembly difficult.

With regard to circumferentially continuous, tubular sleeves, in order to provide a high impact resistance, it is generally necessary to provide the finish sleeve as having multiple layers, such as via reverse folding one portion of the sleeve over another portion, or by using two separate sleeves disposed about one another. Unfortunately, aside from adding cost via the inclusion of excess material and assembly labor, the resulting sleeve can be overly bulky and have restricted flexibility, as discussed above with regard to wrappable sleeve, and thus, can be difficult or impossible to assemble in tight, meandering spaces.

Accordingly, what is needed is a sleeve that provides enhanced protection to an elongate member contained therein, particularly against impact, abrasion and contamination, remains fixed in place while in use, is useful over a wide range of elongate member diameters, is economical in manufacture and assembly, is highly flexible and exhibits a long and useful life.

SUMMARY OF THE INVENTION

One aspect of the disclosure provides a protective textile sleeve for routing and protecting elongate members. The sleeve, in accordance with one embodiment of the disclosure, includes a plurality of yarns interlaced with one another, with the interlaced yarns forming an elongate, circumferentially continuous, tubular wall extending lengthwise along a longitudinal axis between opposite open ends, wherein at least some of the plurality of yarns include tubular yarn(s). The tubular yarn(s) provide the sleeve with enhanced impact resistance, thus, providing the contents being protected within the sleeve protection against inadvertent damage from impact forces. Further, the tubular yarn(s) negates having to form the wall having more than one layer to provide enhanced impact resistance, thus, allowing the sleeve to be used in applications with relatively tight space constraints and further, reducing the mass of the sleeve while also enhancing the flexibility of the sleeve by only having a single layer wall.

In accordance with another aspect of the disclosure, the tubular yarn is provided having a tubular braided wall formed by a plurality of filaments braided with one another.

In accordance with another aspect of the disclosure, the plurality of filaments forming the tubular braided wall of the tubular yarn can be provided including heat-shrinkable, thermoplastic monofilaments, thereby providing the protective sleeve with an ability to be radially constricted into close abutment with the contents being protected therein, which aside from reducing the outer envelop, also acts to fix the sleeve against movement relative to the contents.

In accordance with another aspect of the disclosure, the entirety of the plurality of filaments forming the tubular braided wall of the tubular yarn can be provided as heat-shrinkable filaments to maximize the ability of the sleeve to be radially constricted via a heat-shrink process.

In accordance with another aspect of the disclosure, at least some of the plurality of yarns forming the tubular wall of the sleeve can be non-heat-shrinkable filaments to provide enhanced protection against ingress of contaminants, thermal conditions, abrasion, and impact forces, for example.

In accordance with another aspect of the disclosure, at least some of the plurality of filaments forming the tubular braided wall of the tubular yarn can be provided as non-heat-shrinkable filaments.

In accordance with another aspect of the disclosure, the tubular yarn can be provided having an inner surface bounding a cavity having a diameter between about 0.5-10 mm.

In accordance with another aspect of the disclosure, the plurality of yarns forming the sleeve wall can be braided with one another.

In accordance with another aspect of the disclosure, the plurality of yarns forming the tubular wall of the sleeve can be knitted with one another.

In accordance with another aspect of the disclosure, the plurality of yarns forming the wall of the sleeve can be woven including warp yarn extending generally parallel to the longitudinal axis and weft yarn extending generally transversely to the warp yarn.

In accordance with another aspect of the disclosure, at least some the warp yarn can be provided as the tubular yarn and at least some of the warp yarn can be provided as non-tubular multifilament and/or monofilament yarn, as desired to provide the type of protection desired, such as protection against abrasion, where monofilaments would be optimal, or enhanced coverage, where multifilaments would be optimal.

In accordance with another aspect of the disclosure, a plurality of the warp yarns can be provided as tubular yarn in immediately adjacent relation with one another, with no non-tubular yarn intervening therebetween, and a plurality of the warp yarns can be provided as non-tubular yarns in immediately adjacent relation with one another, with no tubular yarn intervening therebetween, thereby forming enhanced impact resistant sectors of the tubular yarn, while proving the remaining sector having the desired protective properties sought, particular to the intended application.

In accordance with another aspect of the disclosure, at least some of the weft yarns can provided as tubular yarn and at least some of the weft yarns can be provided as non-tubular yarn, thereby being able to strategically locate the more expensive, increased impact resistant tubular yarn where desired.

In accordance with another aspect of the disclosure, a plurality of picks of the weft yarn can be provided as tubular yarn in immediately adjacent relation with one another, with no picks of non-tubular yarn intervening therebetween, and a plurality of the picks of the non-tubular yarn can be provided in immediately adjacent relation with one another, with no picks of tubular yarn intervening therebetween. As such, an ability to form precisely located circumferentially extending bands of the impact resistant tubular yarns, with intervening bands having non-tubular yarns of the material desired, including monofilaments and/or multifilaments, is provided, thereby resulting in a highly impact resistant, economical, flexible sleeve.

In accordance with another aspect of the disclosure, the elongate, circumferentially continuous, tubular wall can be formed having a uniform density along its entire length.

In accordance with another aspect of the disclosure, the elongate, circumferentially continuous, tubular wall can be formed having a non-uniform density along at least a portion of its length and/or circumference, which can result from strategically locating the tubular yarns relative to the non-tubular yarns to provide impact resistance in localized regions of the sleeve, thus providing a highly impact resistant, economical, flexible sleeve.

In accordance with another aspect of the disclosure, at least some of the plurality of yarns can include weft and/or warp inserted tubular yarn(s).

In accordance with another aspect of the disclosure, a method of constructing a textile sleeve for routing and protecting elongate members is provided. The method includes interlacing a plurality of yarns with one another to form an elongate, circumferentially continuous, tubular wall extending lengthwise along a longitudinal axis between opposite open ends, and providing at least some of the plurality of yarns as tubular yarn.

In accordance with another aspect of the disclosure, the method can further include providing the tubular yarn having a tubular braided wall formed by a plurality of filaments braided with one another.

In accordance with another aspect of the disclosure, the method can further include providing at least some of the plurality of filaments forming the tubular braided wall of the tubular yarn as a heat-shrinkable filament.

In accordance with another aspect of the disclosure, the method can further include providing the entirety of the plurality of filaments forming the tubular braided wall of the tubular yarn as heat-shrinkable filaments.

In accordance with another aspect of the disclosure, the method can further include providing at least some of the plurality of yarns forming the tubular braided wall of the tubular yarn as a non-heat-shrinkable filament.

In accordance with another aspect of the disclosure, the method can further include providing the entirety of the plurality of filaments forming the tubular braided wall of the tubular yarn as non-heat-shrinkable filaments.

In accordance with another aspect of the disclosure, the method can further include providing the tubular yarn having an inner surface bounding a cavity having a diameter between about 0.5-10 mm.

In accordance with another aspect of the disclosure, the method can further include performing the interlacing via a braiding process.

In accordance with another aspect of the disclosure, the method can further include performing the interlacing via a knitting process.

In accordance with another aspect of the disclosure, the method can further include performing the interlacing via a weaving process, with the plurality of yarns including warp yarn extending generally parallel to the longitudinal axis and weft yarn extending generally transversely to the warp yarn.

In accordance with another aspect of the disclosure, the method can further include providing at least some the warp yarn as tubular yarn and at least some of the warp yarn as non-tubular yarn.

In accordance with another aspect of the disclosure, the method can further include providing a plurality of the warp yarn as the tubular yarn in immediately adjacent relation with one another and providing a plurality of the non-tubular warp yarn in immediately adjacent relation with one another.

In accordance with another aspect of the disclosure, the method can further include providing at least some the weft yarn as tubular yarn and providing at least some of the weft yarn as non-tubular yarn.

In accordance with another aspect of the disclosure, the method can further include forming the elongate, circumferentially continuous, tubular wall having a substantially uniform yarn density along its entire length.

In accordance with another aspect of the disclosure, the method can further include forming the elongate, circumferentially continuous, tubular wall having a non-uniform yarn density along its length and/or about its circumference.

In accordance with another aspect of the disclosure, the method can further include inserting at least some of tubular yarn with the braided, knit, or woven yarns.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

FIG. 1 is a schematic perspective view of a woven tubular, textile sleeve shown in accordance with one aspect of the disclosure shown disposed about an elongate member to be protected;

FIG. 1A is an enlarged schematic fragmentary plan view of a wall of the tubular, textile sleeve of FIG. 1;

FIG. 1B is a schematic side view a tubular, textile sleeve shown in accordance with another aspect of the disclosure;

FIG. 1C is a schematic end elevation view of a wall of a tubular, textile sleeve constructed in accordance with yet another aspect of the disclosure;

FIG. 6A is an enlarged schematic fragmentary plan view of a wall of the tubular, textile sleeve of FIG. 6;

FIG. 7A is a schematic end elevation view of a tubular, textile sleeve shown in accordance with yet another aspect of the disclosure shown in a first expanded state about an elongate member to be protected;

FIG. 7B is a view similar to FIG. 7A with the tubular, textile sleeve shown in a second contracted state about the elongate member to be protected; and FIG. 8 is a schematic, partial perspective view of a tubular yarn used in the construction of the sleeves of FIGS. 1 and 1A.

DETAILED DESCRIPTION OF PRESENTLY PREFERRED EMBODIMENTS

Figure 2:
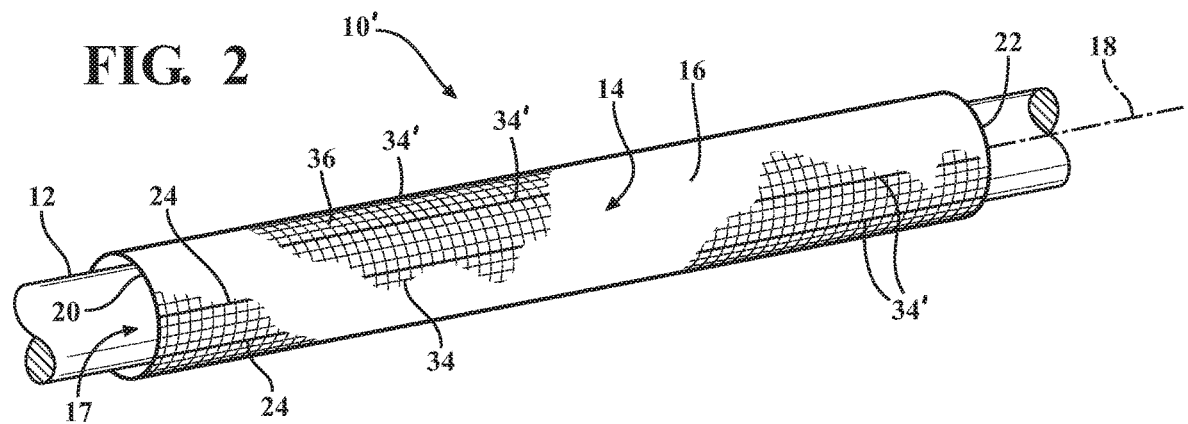
FIG. 2 is a schematic perspective view of a woven insert tubular, textile sleeve shown in accordance with another aspect of the disclosure shown disposed about an elongate member to be protected.

Referring in more detail to the drawings, FIGS. 1-6 schematically illustrate tubular, textile sleeves 10, 10', 110, 110', 210, 210', respectively, constructed in accordance with different aspects of the disclosure, wherein the same reference numerals are used to identify like features, unless otherwise noted, offset by 100 series numerals and/or prime symbols ('). The sleeves 10, 10', 110, 110', 210, 210' are shown as being disposed about an elongate member 12, such as a wire harness, cable, tube, or the like, to be protected. In FIGS. 1 and 2, the sleeves 10, 10' are shown as having been constructed via a weaving process, in FIGS. 3 and 4, the sleeves 110, 110' are shown as having been constructed via a braiding process, and in FIGS. 5 and 6, the sleeves 210, 210' are shown as having been constructed via a knitting process. FIGS. 7A and 7B illustrate another aspect of the disclosure wherein the sleeve 10, 10', 110, 110', 210, 210' can be constructed to be shrinkable, and thus, is schematically shown in FIG. 7A in a first, diametrically expanded, partially assembled state, as initially constructed, while in FIG. 7B, the sleeve 10, 10', 110, 110', 210, 210' is shown in a second, diametrically shrunken (via application of a suitable source of heat, by way of example and without limitation, to cause the sleeve 10, 10', 110, 110', 210, 210' to become radially contracted), fully assembled state about the elongate member 12, referred to hereafter as shrunken state or second state, thereby minimizing the outer envelop or diameter of the assembly. The sleeves 10, 10', 110, 110', 210, 210' have an elongate wall 14 having a circumferentially continuous, tubular outer periphery 16 and inner cavity 17 extending along a central longitudinal axis 18 between opposite open ends 20, 22. It is to be understood that by being circumferentially continuous and tubular, that the sleeves 10, 10', 110, 110', 210, 210' do not have lengthwise extending free side edges, but rather, are seamless such that the walls 14 cannot be unwrapped or opened along their length. The walls 14 each include a plurality of yarns interlaced with one another (via weaving in FIGS. 1 and 2, via braiding in FIGS. 3 and 4, and via knitting in FIGS. 5 and 6), wherein at least some of the plurality of yarns include tubular yarn 24 (FIG. 8), while others of the yarn(s) may include non-tubular yarn 25, such as any desired solid monofilament and/or solid multifilament. With the walls 14 being formed at least in part, or in their entirety, with the tubular yarn 24, as discussed in further detail below, enhanced impact resistance is provided in the areas having the tubular yarn 24, thereby providing enhanced protection to the elongate member 12 against damage from impact forces. It will be appreciated by those skilled in the art that a tubular wall 30 of the tubular yarn 24 effectively provides a dual walled structure, with a hollow cavity 28 extending through the length of the yarn 24 further providing enhanced dampening properties to the sleeve walls 14.

The tubular yarn 24, in accordance with one aspect of the disclosure, as best shown schematically in FIG. 8, has a mini-tubular braided wall 30 providing an inner surface 26 bounding the hollow cavity 28 having a diameter between about 0.5-10 mm. The tubular braided wall 30 is formed by a plurality of yarn filaments 32 braided with one another. The yarn filaments 32 can be provided as multifilaments and/or monofilaments, as desired for the intended application. At least some, or the entirety, of the filaments 32 can be provided as non-shrinkable, or substantially non-shrinkable yarns, meaning that the yarn 26 may shrink somewhat, such as up to between about 1-10% of its original length, but nowhere near to the extent as the shrinkable yarn, which shrinks about 20% or more of its original length. However, heat-shrinkable filaments can be incorporated in the tubular yarn 24, at least in part or in entirety, thereby providing the sleeve 10, 100 with radially contractible, heat-shrinkable properties.

Referring in more detail to FIG. 1, the wall 14 can include warp yarns 34 extending generally parallel to the longitudinal axis 18 and weft yarn(s) 36 extending generally transversely to the warp yarns 34, with the warp yarns 34 and the weft yarn 36 being woven with one another in any desired weave pattern, such as plain, twill, basket, satin, sateen, or other known weave patterns. The warp yarns 34 and weft yarn(s) 36 can be provided including non-tubular yarn(s) 25 of monofilaments and/or multifilaments, as desired for the intended application. If intended to be shrinkable, at least some of the weft yarn 36 can be provided as heat-shrinkable yarn, whether provided as non-tubular yarn 25 and/or incorporated into the tubular yarn 24. With reference to FIGS. 1 and 1A, in accordance with one aspect, the woven sleeve 10 can include warp yarns 34 of the tubular yarn 24, wherein the tubular yarn 24 can provide the entirety of the warp yarn 34, or less, depending on the degree and location of impact resistance desired. Further, the weft yarn 36 can be provided as non-tubular, heat-shrinkable yarn 25 either in part or in entirety, with FIG. 7A illustrating the sleeve 10 in an "as woven" first, diametrically expanded state, and with FIG. 7B illustrating the sleeve 10 in a second, diametrically shrunken state. In accordance with another aspect, as shown in FIG. 1B, a woven sleeve 10" can be formed to include at least some the weft yarn 36 provided as tubular yarn 24 and at least some of the weft yarn 36 provided as non-tubular yarn 25, including monofilaments and/or multifilaments. In the embodiment of FIG. 1B, circumferentially extending bands (o) are formed of weft yarns 36 provided as tubular yarn 24, while intervening bands (x) are formed of weft yarns 36 provided as non-tubular yarn 25, including monofilaments and/or multifilaments of heat-shrinkable and/or non-heat-shrinkable yarn.

In accordance with yet another aspect, as shown in FIG. 1C, a woven sleeve 10''' can be formed to include at least some the warp yarns 34 provided as tubular yarn 24 and at least some of the warp yarn 34 provided as non-tubular yarn 25, including monofilaments and/or multifilaments. In the embodiment of FIG. 1C a sector (x), of a desired degree, ranging anywhere between 0-360 degrees, shown in a non-limiting embodiment as about 120 degrees, is formed including warp yarns 34 provided as tubular yarn 24, while a remaining sector is formed including warp yarns 34 provided as non-tubular yarn 25, including monofilaments and/or multifilaments, as desired. The tubular yarn 24 can be woven in immediately adjacent, contiguous relation with one another over the desired target sector (x) and the non-tubular yarn 25 can also be woven in immediately adjacent, contiguous relation with one another. Otherwise, it is contemplated that tubular 24 and non-tubular 25 warp yarns can be alternated with one another in any desired fashion and groupings or bundles, including uniformly about the circumference of the sleeve, if desired.

Figure 2A:
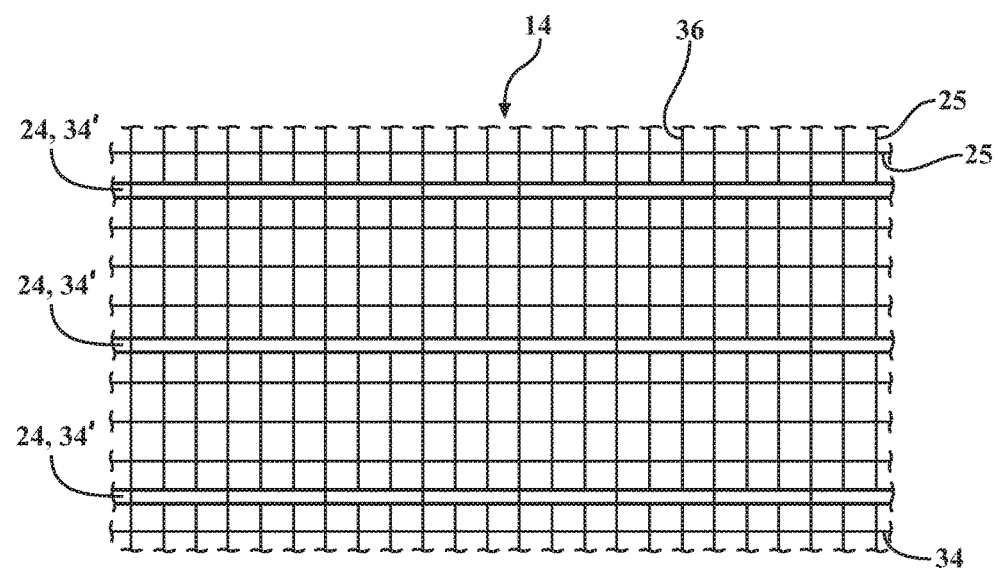
FIG. 2A is an enlarged schematic fragmentary plan view of a wall of the tubular, textile sleeve of FIG. 2.

In accordance with yet another aspect, as shown in FIG. 2, a woven sleeve 10' is shown constructed similarly to that discussed above for sleeve 10, having a wall 14 including warp yarns 34 extending generally parallel to the longitudinal axis 18 and weft yarn(s) 36 extending generally transversely to the warp yarns 34, with the warp yarns 34 and the weft yarn 36 being woven with one another in any desired weave pattern, plain, twill, basket, satin, sateen, or otherwise; however, as best shown in FIG. 2A, the wall 14 also includes inserted warp yarns 34' of the tubular yarn 24. If intended to be shrinkable, at least some of the weft yarn 36 can be provided as heat-shrinkable yarn. The non-inserted, woven warp yarns 34 and weft yarn(s) 36 can be provided including non-tubular yarn(s) 25 of monofilaments and/or multifilaments, as discussed above and as desired for the intended application. The inserted tubular warp yarns 34', wherein 'inserted' is intended to take on its customary meaning, meaning the inserted tubular yarns 24 are captured between and by the woven, undulating weft non-tubular yarns 25, can be provided as discussed above for the tubular yarns 24 and as shown in FIG. 8. The inserted tubular yarn 24 can be inserted uniformly in symmetrical relation with one another about the circumference of the wall 14, or non-uniformly about the circumference, depending on the degree and location of impact resistance desired. Accordingly, different sectors (spanning less than 360 degrees about the circumference of the wall 14) can include more or fewer inserted tubular yarns 25, including none in one or more sectors, as desired for the intended application.

Figure 3:
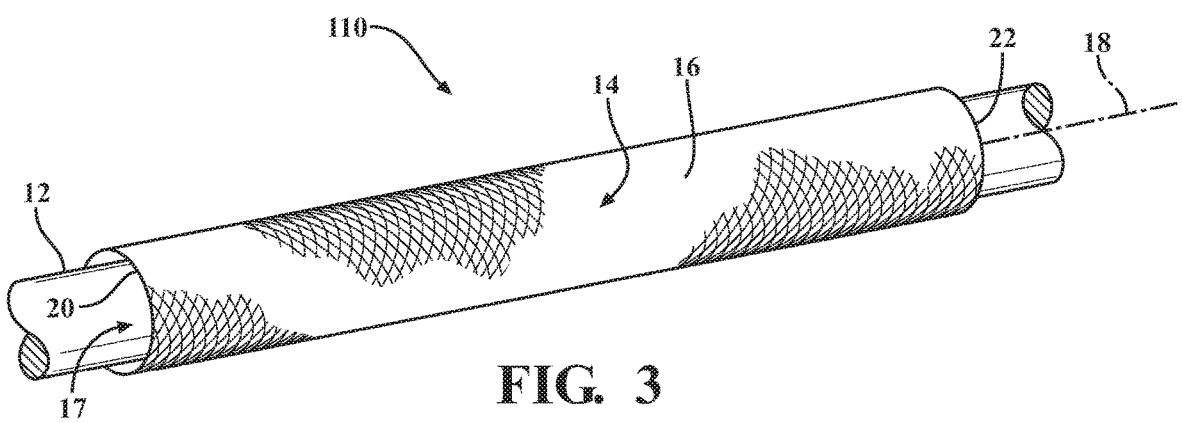
FIG. 3 is a schematic perspective view of a braided tubular, textile sleeve shown in accordance with another aspect of the disclosure shown disposed about an elongate member to be protected.
Figure 3A:
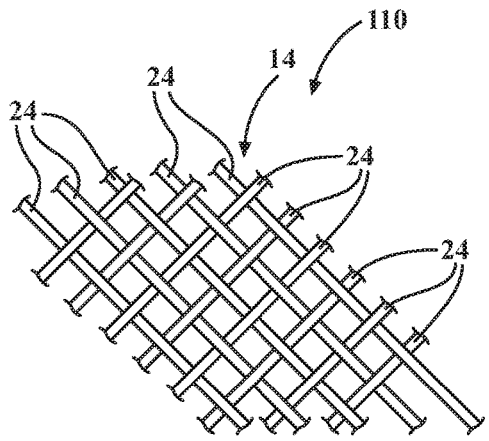
FIG. 3A is an enlarged schematic fragmentary plan view of a wall of the tubular, textile sleeve of FIG. 3.
Figure 3B:
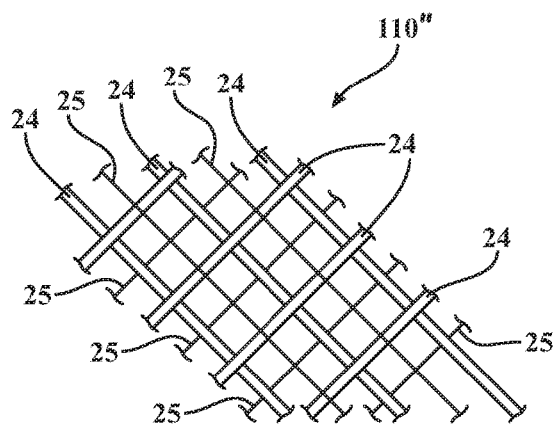
FIG. 3B is a view similar to FIG. 3A of a braided wall of a braided tubular, textile sleeve constructed in accordance with another aspect of the disclosure.

With reference to FIGS. 3 and 3A, a sleeve 110 can be braided including the tubular yarns 24 braided with one another. In the embodiment illustrated, as best shown in FIG. 3A, the entirety of the yarns can be provided as tubular yarns 24, such that each carrier of the braiding machine is provided with tubular yarns 24, thereby maximizing the impact resistance of the sleeve 110. Otherwise, as shown in FIG. 3B, a sleeve 110" can be braided including tubular yarns 24 from some of the carriers and non-tubular yarns 25 from the remaining carriers, with the non-tubular yarns 25 including monofilaments and/or multifilaments of heat-shrinkable and/or non-heat-shrinkable yarns, braided with one another. As shown in FIG. 3B, the tubular yarns 24 and non-tubular yarns 25 can be braided uniformly with one another, such that the respective tubular yarns 24 and non-tubular yarns 25 alternate with one another in 1:1 relation in the opposite helical S and Z directions, with other uniform and non-uniform relationships being contemplated herein.

Figure 4:
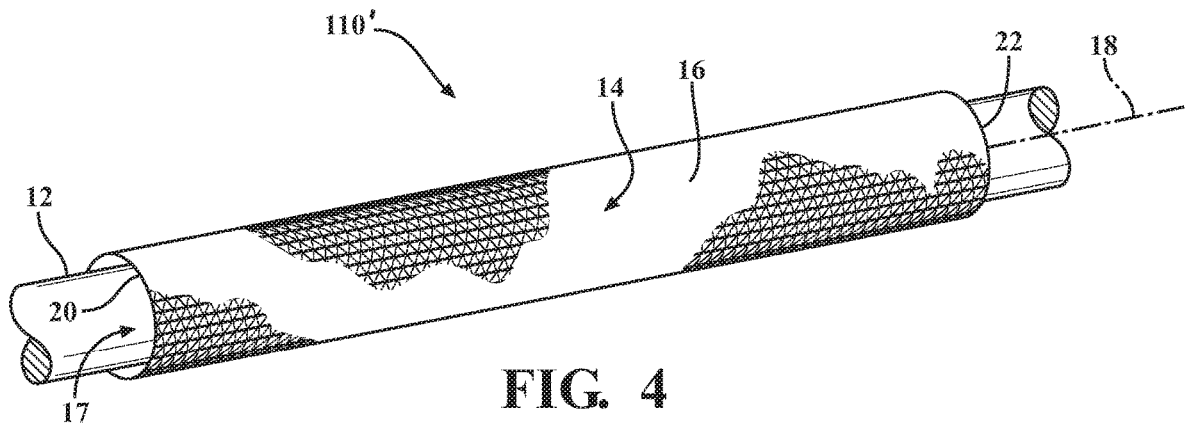
FIG. 4 is a schematic perspective view of a braided insert tubular, textile sleeve shown in accordance with another aspect of the disclosure shown disposed about an elongate member to be protected.
Figure 4A:
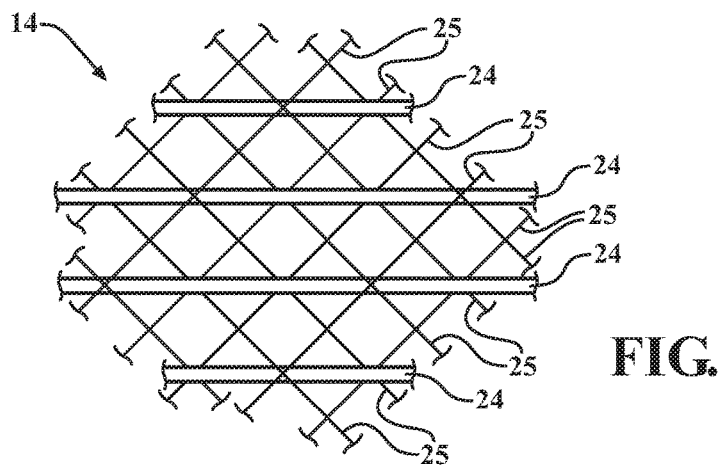
FIG. 4A is an enlarged schematic fragmentary plan view of a wall of the tubular, textile sleeve of FIG. 4.

In accordance with yet another aspect, as shown in FIG. 4, a braided sleeve 110' is shown constructed similarly to that discussed above for sleeve 110, having a wall 14 including braided yarns, such as braided non-tubular yarns 25 of the variety discussed above for non-tubular yarns 25; however, as best shown in FIG. 4A, the wall 14 also includes inserted lengthwise extending tubular yarns 24. Accordingly, the sleeve 110' can be braided including non-tubular yarns 25 in opposite helical S and Z directions with one another, including monofilaments and/or multifilaments of heat-shrinkable and/or non-heat-shrinkable yarns, and further, with tubular yarns 24 inserted warp-wise (lengthwise in straight fashion) in captured relation between select ones of the non-tubular yarns 25 extending in opposite helical S and Z directions. The tubular yarns 24 can skip over a plurality of crossing non-tubular yarns 25 in floating fashion and then dip between or beneath the crossing non-tubular yarns 25 and then rise above the crossing non-tubular yarns 25 in repeating fashion, as shown. In the embodiment illustrated, the crossing non-tubular yarns 25 float over 2 nodes (crossing locations of the crossing non-tubular yarns 25) and dip beneath a single node in repeating fashion, although it is to be recognized that any desired pattern can be attained, as desired. As discussed above, the tubular yarns 24 provided enhanced impact resistance, and can be inserted uniformly about the circumference of the wall 14, or non-uniformly, depending on the areas requiring enhanced impact resistance.

Figure 5:
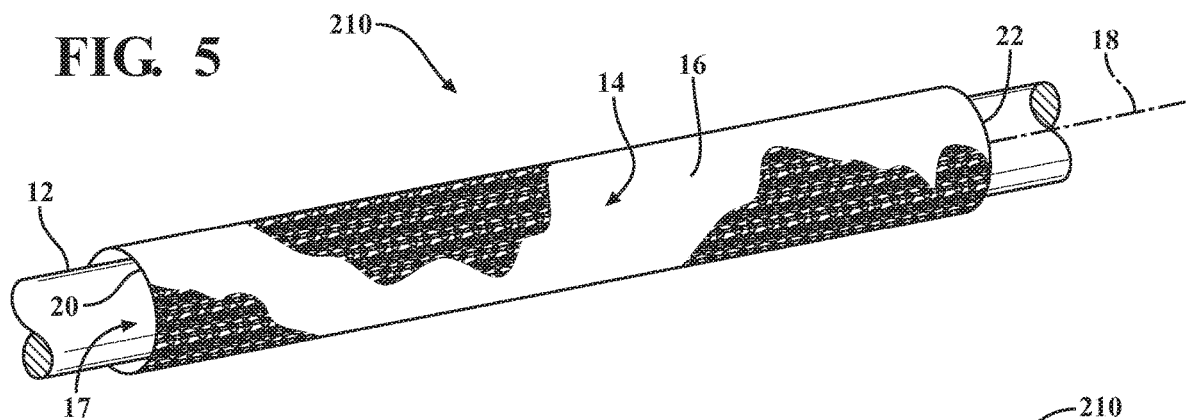
FIG. 5 is a schematic perspective view of a knit tubular, textile sleeve shown in accordance with another aspect of the disclosure shown disposed about an elongate member to be protected.
Figure 5A:
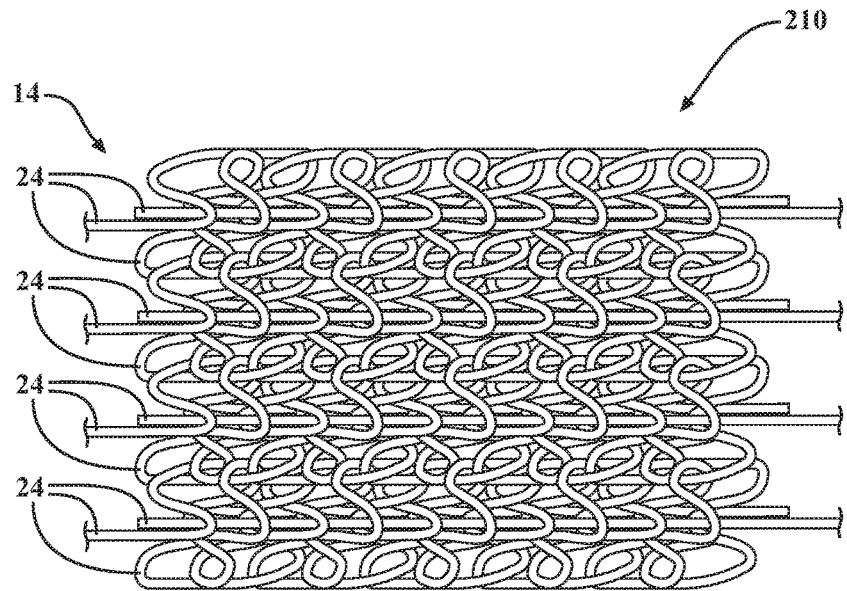
FIG. 5A is an enlarged schematic fragmentary plan view of a wall of the tubular, textile sleeve of FIG. 5.

With reference to FIGS. 5 and 5A, a sleeve 110 can be knitted including the tubular yarns 24 knitted with one another. In the embodiment illustrated, as best shown in FIG. 6A, the entirety of the yarns can be provided as tubular yarns 24, such that each carrier of the knitting machine is provided with tubular yarns 24, thereby maximizing the impact resistance of the sleeve 210. Otherwise, the sleeve 210 can be knit including tubular yarns 24 and non-tubular yarns 25, with the non-tubular yarns 25 including monofilaments and/or multifilaments of heat-shrinkable and/or non-heat-shrinkable yarns, knit with one another. The knit stitch type, e.g. open or closed chain stitch, tricot stitch, by way of example and without limitation, density and pattern can be selected as desired for the intended application.

Figure 6:
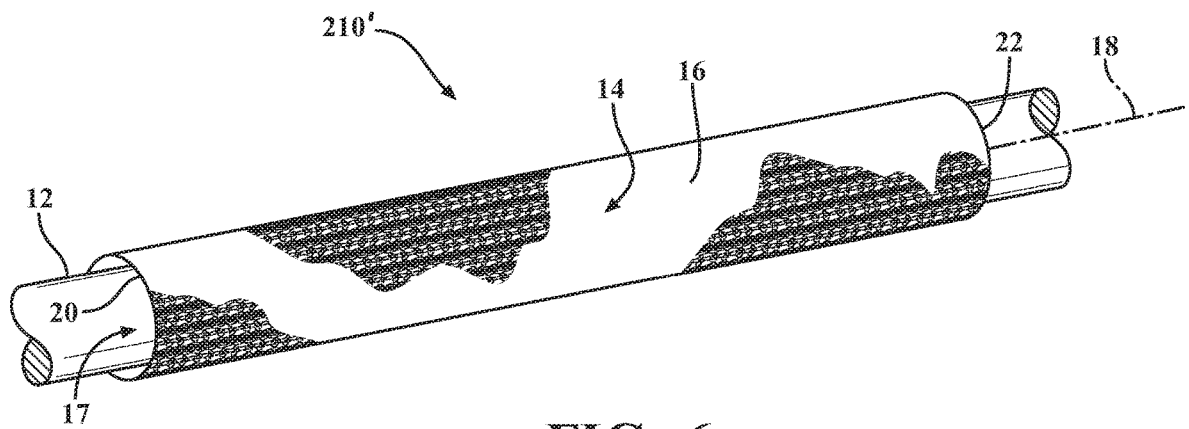
FIG. 6 is a schematic perspective view of a knit insert tubular, textile sleeve shown in accordance with another aspect of the disclosure shown disposed about an elongate member to be protected.

In accordance with yet another aspect, as shown in FIG. 6, a knit sleeve 210' is shown constructed similarly to that discussed above for sleeve 210, having a wall 14 including knit yarns, such as knit non-tubular yarns 25 of the variety discussed above; however, as best shown in FIG. 6A, the wall 14 also includes inserted lengthwise extending tubular yarns 24. Accordingly, the sleeve 210' can be knit including non-tubular yarns 25 knit with one another via any desired knit stitch type, pattern, and density, including monofilaments and/or multifilaments of heat-shrinkable and/or non-heat-shrinkable yarns, and further, with the tubular yarns 24 inserted warp-wise (lengthwise in straight fashion) in captured relation between select ones of the knit non-tubular yarns 25. The tubular yarns 24 can skip over a plurality of knit non-tubular yarns 25 in floating fashion and then dip between or beneath the knit non-tubular yarns 25 and then rise above the knit non-tubular yarns 25 in repeating fashion, as desired, or the tubular yarns 24 can be inserted and captured along the entirety of the knit non-tubular yarns 25, as desired. As discussed above, the tubular yarns 24 provided enhanced impact resistance, and can be inserted uniformly about the circumference of the wall 14, or non-uniformly, depending on the areas requiring enhanced impact resistance.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A textile sleeve for routing and protecting elongate members, comprising:
   a plurality of yarns interlaced with one another forming an elongate, circumferentially continuous, tubular wall extending lengthwise along a longitudinal axis between opposite open ends, wherein at least some of said plurality of yarns include tubular yarn.

2. The textile sleeve of claim 1, wherein said tubular yarn has a tubular braided wall formed by a plurality of filaments braided with one another.

3. The textile sleeve of claim 2, wherein said plurality of filaments forming said tubular braided wall include a heat-shrinkable filament.

4. The textile sleeve of claim 3, wherein the entirety of said plurality of filaments forming said tubular braided wall are heat-shrinkable filaments.

5. The textile sleeve of claim 4, wherein at least some of said plurality of yarns forming said tubular wall are non-heat-shrinkable filaments.

6. The textile sleeve of claim 2, wherein at least some of said plurality of filaments forming said tubular braided wall are non-heat-shrinkable filaments.

7. The textile sleeve of claim 6, wherein the entirety of said plurality of filaments forming said tubular braided wall are non-heat-shrinkable filaments.

8. The textile sleeve of claim 7, wherein at least some of said plurality of yarns are heat-shrinkable yarns.

9. The textile sleeve of claim 1, wherein at least some of said plurality of yarns are heat-shrinkable yarns.

10. The textile sleeve of claim 9, wherein the entirety of said plurality of yarns are heat-shrinkable yarns.

11. The textile sleeve of claim 1, wherein said tubular yarn has an inner surface bounding a cavity having a diameter between about 0.5-10 mm.

12. The textile sleeve of claim 1, wherein said plurality of yarns are braided with one another.

13. The textile sleeve of claim 1, wherein said plurality of yarns include warp yarn extending generally parallel to said longitudinal axis and weft yarn extending generally transversely to said warp yarn, said warp yarn and said weft yarn being woven with one another.

14. The textile sleeve of claim 13, wherein at least some said warp yarn is provided as said tubular yarn and at least some of said warp yarn is provided as non-tubular yarn.

15. The textile sleeve of claim 14, wherein a plurality of said warp yarn is provided as said tubular yarn in immediately adjacent relation with one another and a plurality of said non-tubular yarn is provided in immediately adjacent relation with one another.

16. The textile sleeve of claim 14, wherein at least some said weft yarn is provided as said tubular yarn and at least some of said weft yarn is provided as non-tubular yarn.

17. The textile sleeve of claim 13, wherein at least some said weft yarn is provided as said tubular yarn and at least some of said weft yarn is provided as non-tubular yarn.

18. The textile sleeve of claim 17, wherein a plurality of said weft yarn is provided as said tubular yarn in immediately adjacent relation with one another and a plurality of said non-tubular yarn is provided in immediately adjacent relation with one another.

19. The textile sleeve of claim 13, wherein said elongate, circumferentially continuous, tubular wall has a uniform density along its length.

20. The textile sleeve of claim 13, wherein said elongate, circumferentially continuous, tubular wall has a non-uniform density along at least one of its length and circumference.

21. The textile sleeve of claim 1, wherein said elongate, circumferentially continuous, tubular wall has a uniform density along its length.

22. The textile sleeve of claim 1, wherein said elongate, circumferentially continuous, tubular wall has a non-uniform density along at least one of its length and circumference.

23. A method of constructing a textile sleeve for routing and protecting elongate members, comprising:
   interlacing a plurality of yarns with one another to form an elongate, circumferentially continuous, tubular wall extending lengthwise along a longitudinal axis between opposite open ends, wherein at least some of the plurality of yarns include tubular yarn.

24. The method of claim 23, further including providing the tubular yarn having a tubular braided wall formed by a plurality of filaments braided with one another.

25. The method of claim 24, further including providing the plurality of filaments forming the tubular braided wall including a heat-shrinkable filament.

26. The method of claim 25, further including providing the entirety of the plurality of filaments forming the tubular braided wall as heat-shrinkable filaments.

27. The method of claim 26, further including providing at least some of the plurality of yarns forming the tubular braided wall as non-heat-shrinkable filaments.

28. The method of claim 24, further including providing at least some of the plurality of filaments forming the tubular braided wall as non-heat-shrinkable filaments.

29. The method of claim 24, further including providing the entirety of the plurality of filaments forming the tubular braided wall as non-heat-shrinkable filaments.

30. The method of claim 29, further including providing at least some of the plurality of yarns as heat-shrinkable yarns.

31. The method of claim 23, further including providing at least some of the plurality of yarns as heat-shrinkable yarns.

32. The method of claim 31, further including providing the entirety of the plurality of yarns as heat-shrinkable yarns.

33. The method of claim 23, further including providing the tubular yarn having an inner surface bounding a cavity having a diameter between about 0.5-10 mm.

34. The method of claim 23, further including performing the interlacing via a braiding process.

35. The method of claim 23, further including performing the interlacing via a weaving process with the plurality of yarns including warp yarn extending generally parallel to the longitudinal axis and weft yarn extending generally transversely to the warp yarn.

36. The method of claim 35, further including providing at least some of the warp yarn as tubular yarn and providing at least some of the warp yarn as non-tubular yarn.

37. The method of claim 36, further including weaving a plurality of the warp tubular yarn in immediately adjacent relation with one another and weaving a plurality of the warp non-tubular yarn in immediately adjacent relation with one another.

38. The method of claim 36, further including weaving at least some of the weft yarn as tubular yarn and weaving at least some of the weft yarn as non-tubular yarn.

39. The method of claim 35, further including weaving at least some the weft yarn as tubular yarn and weaving at least some of the weft yarn as non-tubular yarn.

40. The method of claim 39, further including weaving a plurality of the weft yarn as tubular yarn in immediately adjacent relation with one another and weaving a plurality of the weft yarn as non-tubular yarn in immediately adjacent relation with one another.

41. The method of claim 35, further including weaving the elongate, circumferentially continuous, tubular wall having a substantially uniform yarn density along its entire length.

42. The method of claim 35, further including weaving the elongate, circumferentially continuous, tubular wall having a non-uniform density its length and/or about its circumference.

43. The method of claim 23, further including weaving the elongate, circumferentially continuous, tubular wall having a uniform yarn density along its entire length.

44. The method of claim 23, further including weaving the elongate, circumferentially continuous, tubular wall having a non-uniform density along its length and/or about its circumference.

* * * * *